UNITED STATES PATENT OFFICE.

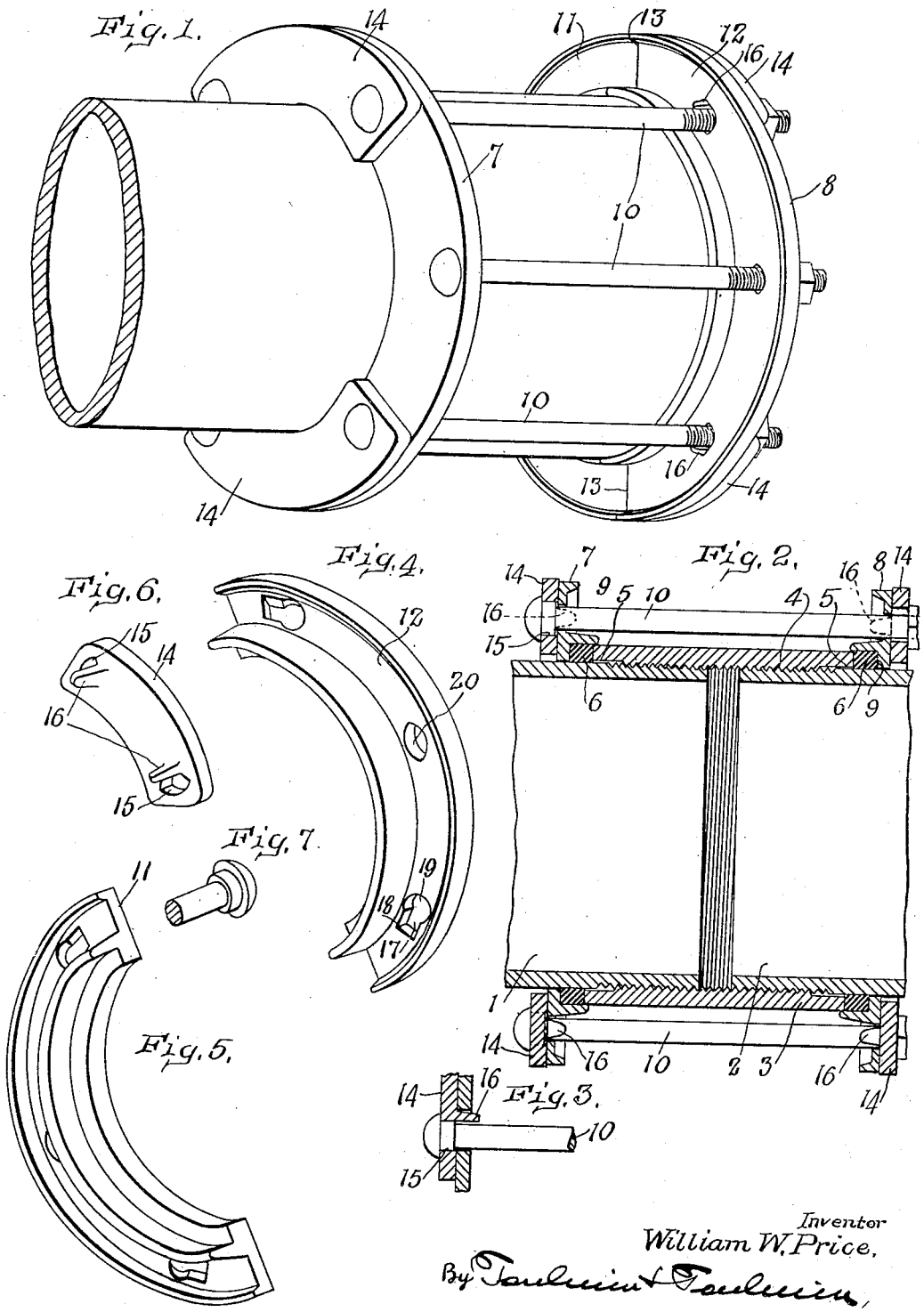
W. W. PRICE.
CLAMP FOR COUPLINGS.
APPLICATION FILED AUG. 24, 1916.
1,240,486.
Patented Sept. 18, 1917.
Inventor
William W. Price,
By Toulmin & Toulmin,
Attorneys

WILLIAM W. PRICE, OF DAYTON, OHIO, ASSIGNOR TO THE DAYTON PIPE COUPLING COMPANY, OF DAYTON, OHIO, A CORPORATION OF OHIO.

CLAMP FOR COUPLINGS.

1,240,486.   Specification of Letters Patent.   Patented Sept. 18, 1917.

Application filed August 24, 1916. Serial No. 116,642.

*To all whom it may concern:*

Be it known that I, WILLIAM W. PRICE, a citizen of the United States, residing at Dayton, in the county of Montgomery and State of Ohio, have invented certain new and useful Improvements in Clamps for Couplings, of which the following is a specification, reference being had therein to the accompanying drawing.

This invention relates to clamps for pipe couplings.

An object of the invention is to provide a construction which will prevent the clamp sections from separating or loosening and which will hold the several sections in alinement and rigid, whereby a tight nonleakable coupling is insured.

In the accompanying drawings Figure 1 is a perspective view illustrating the application of my improved clamp to the coupling. Fig. 2 is a sectional view of the same. Fig. 3 is a detail sectional view showing the relation of the connecting plate to the clamping member and the manner of attaching the same thereto. Figs. 4 to 7 are detail views showing the several parts composing the clamp.

In the accompanying drawings, illustrating one embodiment of the invention I have shown a pair of pipes 1 and 2 connected by a sleeve or coupling 3, the parts being screw threaded as shown at 4. My invention is especially adapted for use in connection with the coupling as above described. To prevent leakage at the joints 5, between the ends of the pipe and the coupling, I use circular gaskets 6, which may be made of any suitable material such as rubber or asbestos. In order to retain these gaskets 6 in place and to make the joints 5 tight, clamping members 7 and 8 are provided which are annular to fit the pipe and have recesses 9 which engage the gaskets. The clamping members are held together in clamping relation by means of bolts 10, which will be described more in detail hereinafter. In order that the clamp may be applied, one or both of the members thereof are made in separable sections 11 and 12; these sections abut each other to form the complete annular clamping member, the abutting portions forming joints 13. Overlapping each joint is a plate 14 which conforms to the curvature of the clamping member. This connecting plate is provided with oval openings 15 adapted to receive the bolts 10. These bolts are constructed with oval portions as shown in Fig. 7, which are adapted to fit within the oval openings 15 whereby the rotation of the bolt is prevented. Between the openings 15 the connecting plate is provided with a pair of lugs 16. Each section adjacent the ends thereof has a combined bolt and lug receiving opening 17. The lug is designed to engage the portion 18 of the opening while the bolt will engage the portion 19 thereof. When the parts are assembled, as shown in Figs. 1 and 2, the spreading apart of the sections at joints 13 will be prevented for the reason that if any spreading takes place it would tend to bend the lugs outwardly toward the ends of the connecting plate. Movement of the lugs in this direction, however, will be prevented by the bolts 10, which, as has been described, pass through the same openings as the lugs and lie closely adjacent thereto. The lugs are of considerable depth or length and project beyond the openings 17. The bolt, however, lies closely adjacent the lug throughout its length and will prevent any bending of the same. Each of the clamping sections may also be provided with additional bolt holes 20, if so desired.

The construction above described is one that is very durable and which will prevent all leakage. The cost of manufacture of the same is also very low. The parts can all be formed of steel. The invention is especially applicable where steel is used and the device is much more durable and serviceable than constructions heretofore made of malleable iron or steel.

While I have shown and described one embodiment of my invention it will be understood that this has been chosen for the purpose of illustration and that I do not desire to be limited to the details of construction, for obvious modifications will occur to a person skilled in the art.

Having thus fully described my invention, what I claim as new and desire to secure by Letters Patent, is:—

1. In a device of the character described, sectional clamping members provided with joints, independent interlocking devices overlapping said joints to prevent their separation, clamping devices passing through said sectional members and the interlocking devices of said members, said clamping devices being disposed on each side of said joints in said clamping members.

2. In a device of the character described, a sectional clamping member having a joint and a combined lug and bolt hole at each side of said joint, a connecting plate provided with lugs projecting into said holes and also provided with holes between the lugs and its ends and bolts in contact with said lugs and projecting through said holes.

3. In a device of the character described, a sectional clamping member having a joint and a combined lug and bolt hole at each side of said joint, a connecting plate provided with lugs projecting into said holes and also provided with holes between the lugs and the ends thereof, a coöperating clamping member provided with holes and bolts projecting through said holes and in contact with the outer sides of said lugs.

4. In a device of the character described, sectional clamping members having joints where they abut with a combined lug and bolt hole at each side of said joints, connecting plates provided with lugs projecting into said holes and also provided with holes between the lugs and the ends thereof, said sectional members and connecting plates being disposed on each side of a collar in which are the respective ends of pipe sections coupled by said device.

In testimony whereof, I affix my signature.

WILLIAM W. PRICE.

Copies of this trade-mark may be obtained for five cents each, by addressing the "Commissioner of Patents, Washington, D. C."